United States Patent [19]
Donovan et al.

[11] Patent Number: 6,090,155
[45] Date of Patent: Jul. 18, 2000

[54] OPTIMIZING APPARATUS AND METHOD FOR DEFINING VISIBILITY BOUNDARIES IN COMPILED CODE

[75] Inventors: Robert John Donovan, Rochester; Daniel Rodman Hicks, Byron; James Albert Kryka, Rochester; David John Lambert, Rochester; Robert Ralph Roediger, Rochester, all of Minn.

[73] Assignee: International Business Machines Corporation, Armonk, N.Y.

[21] Appl. No.: 08/461,943

[22] Filed: Jun. 5, 1995

Related U.S. Application Data

[63] Continuation of application No. 08/006,098, Jan. 15, 1993, abandoned.

[51] Int. Cl.[7] .................................................. G06F 9/45
[52] U.S. Cl. ........................................ 717/9; 717/7; 717/5
[58] Field of Search .................................. 395/709, 707, 395/705; 717/9, 7, 5

[56] References Cited

U.S. PATENT DOCUMENTS

| | | | |
|---|---|---|---|
| 4,567,574 | 1/1986 | Saade et al. . | |
| 4,667,290 | 5/1987 | Goss et al. | 364/300 |
| 4,953,084 | 8/1990 | Meloy et al. . | |
| 4,989,132 | 1/1991 | Mellender et al. | 364/200 |
| 5,093,916 | 3/1992 | Karp et al. | 395/700 |
| 5,107,418 | 4/1992 | Cramer et al. | 395/700 |

FOREIGN PATENT DOCUMENTS

| | | |
|---|---|---|
| 57-174749 | 10/1982 | Japan . |
| 63-292338 | 11/1988 | Japan . |
| 03102428 | 4/1991 | Japan . |
| WO9120030 | 12/1991 | WIPO . |

OTHER PUBLICATIONS

"Compiler Design and Construction" by Arthur B. Pyster, Ph.D., 1980 pp. 11–13, 21, 130.
"Code Optimization Across Procedures" by Stephen Richardson et al, Computer, Feb. 1989, pp. 42–50.
"Compile–Time Detection of Aliasing in Euclid Programs" by James R. Cordy, Software–Practice and Experience, vol. 14(8) 755–768 (Aug. 1984).
"Compile, check and execute" by Jonathan Sayles, Database Programming & Design Nov. 1991 v4 n11 p. 67(2).
"Adding an extension language to your software: The little language/application interface" by Neville Franks, Dr. Dobb's Journal Sep. 1991 v16 n9 p. 34(6).
"A Compiler that Increases the Fault Tolerance of Asynchonous Protocols" by Brian A. Coan, IEEE Transactions On Computers, vol. 37, No. 12, Dec. 1988, pp. 1541–1553.

*Primary Examiner*—Tariq R. Hafiz
*Assistant Examiner*—Tuan Q. Dam
*Attorney, Agent, or Firm*—Joan Pennington

[57] ABSTRACT

Apparatus and a method are provided for defining visibility boundaries in compiled code of an optimizing compiler used with a digital computer for converting a source program to an object code. The source program is received and a first intermediate representation of the source program is generated. A pseudo operation representing a predetermined event is inserted in the first intermediate representation. Sequential operations of the first intermediate representation including the inserted pseudo operations are processed for defining an internal data structure of the source program. A visibility boundary for a selected variable is identified responsive to identifying a pseudo operation in the first intermediate representation.

9 Claims, 6 Drawing Sheets

FIG. 1

PRIOR ART

FIG. 2

PRIOR ART

OPTIMIZING APPARATUS AND METHOD FOR DEFINING VISIBILITY BOUNDARIES IN COMPILED CODE

This application is a continuation of application Ser. No. 08/006,098, filed Jan. 15, 1993, now abandoned.

BACKGROUND OF THE INVENTION

1. Field of the Invention

The invention relates generally to method and apparatus carried out on a digital computer for converting a source program to an object code, and more particularly to an optimizing method and apparatus for defining visibility boundaries in compiled code.

2. Description of the Prior Art

Optimizing compilers are described in Aho, Sethi and Ullman, "Compilers: Principles, Techniques and Tools", Addison-Wesley (1986), Chpt. 10, pp. 585–722.

Other prior art examples include:

U.S. Pat. No. 4,567,574 discloses a method for optimizing instruction path lengths in a compilation of COBOL source code with reference to PERFORM statements.

U.S. Pat. No. 4,953,084 discloses an optimizing compiler and method using variable ranges to support symbolic debugging of optimized code. The compiler maintains a list of ranges in a range table.

U.S. Pat. No. 5,107,418 discloses a method for representing scalar data dependencies for an optimizing compiler with a global scalar data dependency graph being created to represent all of the scalar objects in an entire program. Kill sets are calculated by building local graphs.

PCT international application WO 91/20030 discloses a modular compilation technique utilizing a fully integrated hierarchical representation as a common intermediate representation to compile source code programs written in one or more procedural programming languages into an executable object code.

Japan patent JP 63-292338 discloses an optimized program debugging system that informs a debug user of rows changed by optimization, variable names to which values are not set, etc., in an object program optimized by a compiler.

An optimizing compiler can eliminate code determined to be unnecessary for the correct execution of the procedure being compiled. In some cases, stores to the spaces in memory allocated for different variables can be eliminated. This is commonly called Store Elimination. In other instances, loads of the current variables are eliminated if determined that those values could not have changed since last loaded and the last loaded value is still available for use. This is commonly called Load Elimination.

A problem with many prior art optimizing compilers is that they do not effectively process asynchronous events. If an asynchronous event such as a program exception or some form of interprocess communication initiated by another process occurs, the processing which takes place could attempt to either reference or modify some variables in the source program. At the point at which an asynchronous event may occur, stores to variables that could be referenced by the event must be current and following the same point in the procedure, the values of all variables that could have been modified must be loaded from their home storage locations allocated for them.

There are three conventional approaches to the problem where there is a possibility that the actions of some other asynchronously executing program might alter the value of program variables. The first is to simply disable all optimization in programs which might be subject to such asynchronous activity. This is generally effective, but it may severely impact program execution speed.

A second approach is to mark the asynchronously referenced/modified variables as volatile, so that the current values of the variables must always be maintained in main storage, and any references to those variables must be satisfied by fetching the value from main storage. This represents a significant improvement over the first approach, but it still does not achieve the best optimization. For instance, it may be known that an asynchronous modification may occur only between certain lines of a program due to known interactions between the two programs. However, the second approach maintains the volatile variables throughout the entire program.

A third conventional approach is to kill all variables or all variables of some class at certain points in a program. Thus, if it is known that some asynchronous activity might occur between certain lines, then values of variables not yet stored in main storage would be stored at or before a certain line, and all references to variables in or after a certain line would fetch values afresh from main storage. The third approach is most commonly used as a simple approach to the aliasing problem in the case of procedure calls since calls to other procedures, particularly separately compiled procedures may reference or modify variables in some unseen fashion. This approach degrades the performance of the generated code because all variables or all of those of a certain class, such as the external variables in a program are affected and the killing of all variables must occur during every execution of the optimized program, even though the asynchronous activity may only occur in only one out of a thousand program executions.

SUMMARY OF THE INVENTION

Important objects of the present invention are to provide a method and apparatus for compiling a source program overcoming disadvantages of arrangements used in the past; and to provide an optimizing method and apparatus for defining visibility boundaries in compiled code.

In brief, the objects and advantages of the present invention are achieved by apparatus and a method for defining visibility boundaries in compiled code of an optimizing compiler used with a digital computer for converting a source program to an object code. The source program is received and a first intermediate representation of the source program is generated. A pseudo operation representing a predetermined event is inserted in the first intermediate representation. Sequential operations of the first intermediate representation including the inserted pseudo operations are processed for defining an internal data structure of the source program. A visibility boundary for a selected variable is identified responsive to identifying a pseudo operation in the first intermediate representation.

BRIEF DESCRIPTION OF THE DRAWINGS

The present invention, together with the above and other objects and advantages, may best be understood from the following detailed description of the embodiment of the invention illustrated in the drawings, wherein.

DETAILED DESCRIPTION OF THE PREFERRED EMBODIMENT

Figure 1:
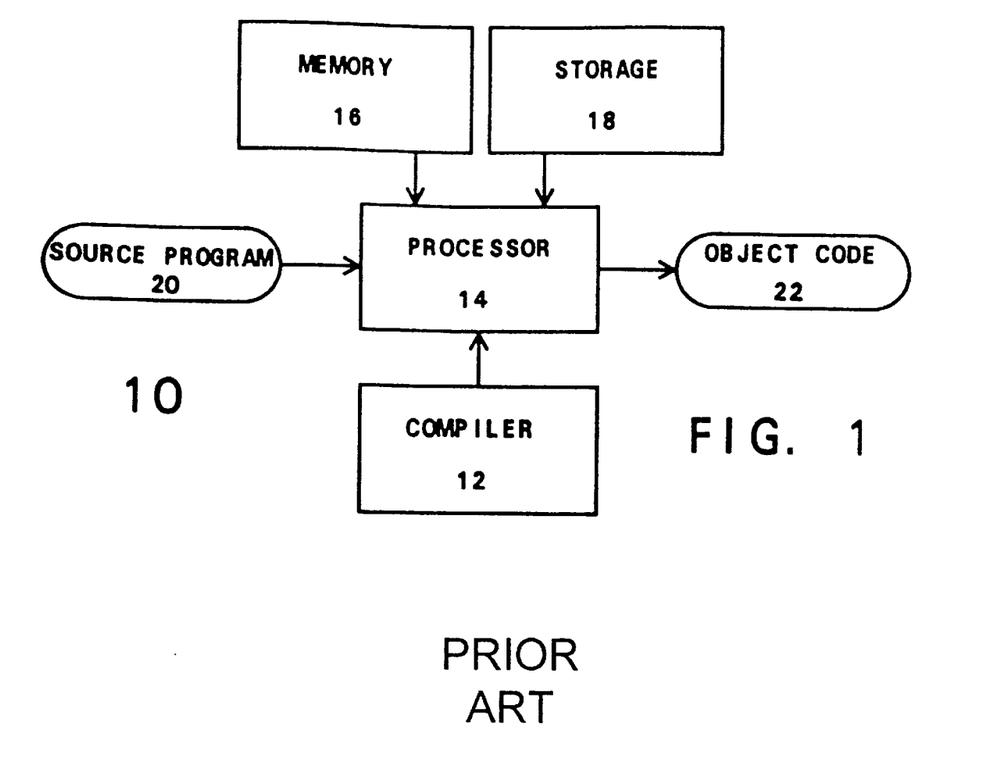
FIG. 1 is a block diagram representation of a computer system embodying the present invention.

In FIG. 1 there is shown a block diagram representation of a computer system 10 for carrying out a method of the invention represented by an optimizing compiler 12. Computer system 10 includes a processor 14, memory 16 and storage 18 adapted for use with compiler 12 for translating a source program 20 to an object code 22. Preferably an IBM AS/400 is used for computer system 10; however, various other commercially available processors could be used. Processor 14 is suitably programmed to execute the flowcharts of FIGS. 2–5 of the invention.

Figure 2:
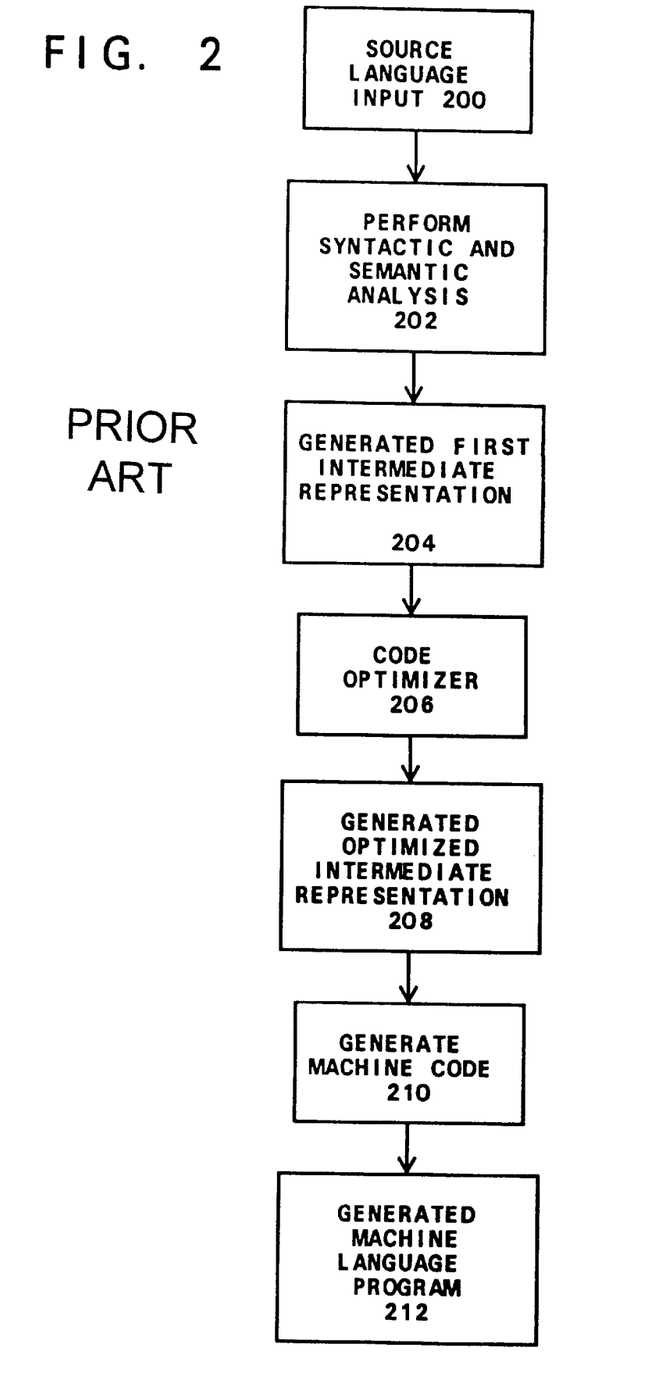
FIG. 2 is a logic flow diagram illustrating typical structure and data flow an optimizing compiler of FIG. 1.

FIG. 2 illustrates typical structure and data flow of the optimizing compiler 12 of FIG. 1. A source language program or input indicated at a block 200 in some source language, such as C or FORTRAN, is read through a compiler front-end indicated at a block 202 which analyzes the program, performing syntactic and semantic analysis to check the source program input for errors and to determine its meaning. The meaning of the program is then incorporated in a first intermediate representation of the language indicated at a block 204. The first intermediate representation has a form chosen to make it easily useable or digestible by subsequent steps.

Following this, the generated first intermediate representation is applied to a code optimizer function indicated at a block 206. The output of the optimizer block 206 is an optimized intermediate representation indicated at a block 208. The optimized intermediate representation preferably has the same form as the first intermediate representation, both to permit by-passing of the optimization step and to permit repeated passes through the optimizing step since this sometimes is capable of finding further possible optimizations.

Next, the optimized intermediate representation is applied to a code generation function as indicated at a block 210. The code generation step 210 converts the optimized intermediate representation into the actual program that a computer can execute as indicated at a block 212. In some cases, further optimizations are performed by this step 210 but generally those of a fairly local nature.

A feature of the present invention is that the first intermediate representation including pseudo operations inserted in accordance with the invention can be used with virtually all code optimization schemes. No matter what form the first intermediate representation takes from human-readable forms that resemble conventional assembler language to highly cryptic forms which are encoded as complex data structures within the compiler, the optimized intermediate representation must consist of a description of data references or to values held in storage or registers, computations on that data, and modifications of that data. The realization of the program at block 212 must precisely define the flow of this data from storage to register to register to storage. Typically the incoming intermediate representation at block 204 in the form of input to the optimizer step 206 does not contain specific assignments of variables to registers. The optimizer 206 provides the best approach to achieve the best performance or satisfy whatever other metric is being optimized. It is critical that the optimization step 206 and the entire compiler 12 produce a final machine language program 212 which precisely implements the meaning or semantics contained in the original source program 20 applied at block 200. Thus, in the process of improving the execution characteristics of the program, the code optimizer 206 must not alter the program in such a way that its meaning is altered, even if this prevents otherwise desirable optimizations.

Figure 4:
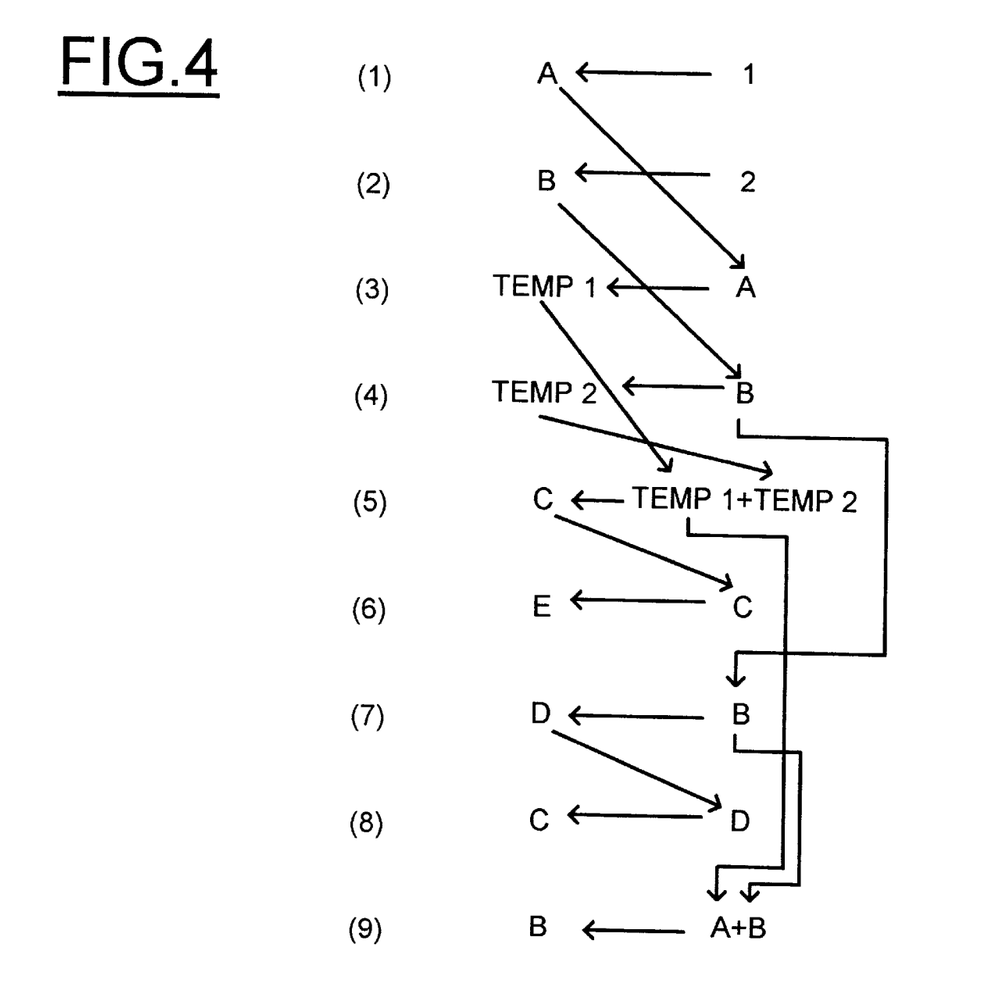
FIG. 4 is a chart illustrating a simplified representation of a typical first intermediate representation generated within an intermediate representation generation block of FIG. 2.

Referring to FIG. 4, there is shown a simplified representation of a typical first intermediate representation generated at block 202. Lines 1, 2, 6, 7 and 8 represent simple assignments of variables. Lines 3, 4 and 5 represent a computation which in a typical programming language is expressed as "C=A+B". Line 9 represents a similar computation, though without the intervening temporaries. The bold left-pointing arrows represent assignment, while the narrow curving arrows represent live ranges further described below. Items appearing on the left-hand side of a bold assignment arrow represent receivers of a value, while items appearing on the right-hand side of a bold arrow represent sources of a value. The symbols 1 and 2 represent the literal values 1 and 2, the + symbol represents the addition operator though the concepts contained here would apply to virtually any form of mathematical manipulation of the values, the symbols A through E represent variables present in the original source program, while the symbols temp1 and temp2 represent temporaries generated by the compiler front-end block 202 in order to represent the semantics of the program.

In a straight-forward realization of this program of FIG. 4 in the absence of any optimization, temp1 and temp2 would be assigned storage locations in the executing processor's main memory, and every line of the representation would represent a storage-to-storage operation. However, most computers have general-purpose registers which can be used to contain values which have been fetched from storage and which can be accessed much faster than main memory. Much of the job of the optimizer block 206 is to decide how to preserve values from main memory in these registers so that storage references and the associated performance costs are minimized.

A first, most obvious optimization would be to assign temp1 and temp2 to registers. This is a totally safe transformation of the program, since, the front-end, in the process of defining these compiler temporaries has assured that their location and content is meaningless in the context of the source program.

Another optimization might be to realize that the variable B is referenced three times in rapid succession, once in line 4, once in line 7 and once in line 9 and preserve in a register the value of B read from main storage in line 4 so that the two subsequent uses of it can reference the fast register rather than slower main storage.

Another optimization would be to realize that the value of B is assigned in line 2 and then reassigned in line 9. Since the only apparent references to the value of B stored in line 2 are in lines 4, 7 and 9, and since the values needed by those references can be fetched from a register loaded prior to line 4, it is easy to see that the expensive modification of B in line 2 can be avoided entirely, with the line being replaced by one that will instead load the necessary value into the register to be used by lines 4, 7 and 9.

The above first three optimizations deal with the live ranges of variables or the ranges within the program where the variables have both an assigned value and an anticipated use. The narrow curving arrows represent these live ranges, with each line beginning with a store to the variable in the left column and continuing through each reference in the right column. The line ends either when there are no more references or when a new store to the variable breaks the live range. In the simplified illustration of FIG. 4, further references to variables beyond line 9 are not represented. In practice, these references would continue the live ranges beyond line 9.

Another form of optimization recognizes common subexpressions. Techniques well known in the art would permit an optimizer to recognize that lines 5 and 9 appear to compute the same value (A+B), and hence the value computed in line 5 can be saved either in a register or in main storage until line 9, thereby avoiding the need for the computation in line 9.

Common subexpressions can have live ranges just as regular variables do, except that their ranges start with the first computation of the expression rather than a store to the variable. For simplicity, FIG. 4 does not show the live ranges of common subexpressions.

It should also be noted that FIG. 4 is an oversimplification in that it represents purely sequential flow. In practice, programs contain branches and loops which cause the individual live ranges to take on the form of a tree or network rather than a single relatively straight line. It should be understood that the same concepts apply in these more complex cases.

While the first of the above four optimizations is safe in that it cannot, when properly done, alter the meaning of the program as conveyed by the front-end, the remaining three can, under certain circumstances, be unsafe. The most common cause for unsafe optimizations has to do with aliasing or the reference or assignment of variables using pointers or records such that the value of a particular variable is referenced or changed without the symbol for that variable appearing directly in the program at the place where the reference or change occurs though the symbol for the other aliased variable does appear in the program. Techniques exist in the art for managing variable aliasing, generally by keeping a table or representation of the dependencies between various variables which may alias or overlay each other.

As an example of the aliasing problem, symbol C could be an alias or another name for symbol B. If this were the case, then it would be invalid to attempt to hold the value of B in a register between lines 4 and 7 or between lines 7 and 9, since assignments to C occur in lines 5 and 8. Similarly, the value computed in line 5 before the assignments in line 5 and 8 could no longer be held and reused in line 9, since the value of B contained in temp2 and used in line 5 would not be the value stored in B by the time line 9 was executed. Finally, the optimizer would be unable to eliminate the store of C in line 5 otherwise possible since the value of C is only used in line 6, with a new value being stored in line 8 since the store is required to establish the correct value of B for line 7.

An asynchronous event problem occurs without any corresponding reference in the source program. Such problems occur when an asynchronous activity references or modifies variables used in the program being compiled. Asynchronous references of this nature may occur as a result of other simultaneously-executing programs as in a computer with multiple processors or as a result of other programs which interrupt the current program in order to execute, for example, programs which handle exceptions or events in computers which are conditions representing errors or I/O device activities which need to be handled immediately. In practice, there are very few cases where the activities in one program affects the operation of another more-or-less simultaneously executing program in this fashion, but those cases that do occur cause problems.

For instance, if there is a possibility that the actions of some other asynchronously executing program might alter the value of B between lines 4 and 7, then it would be invalid to hold B in a register during that time and the value of B would have to be loaded afresh from storage in line 7. For similar reasons, it would be invalid to try to remember the value of "A+B" computed in line 5 and reuse it in line 9. Or, if some asynchronously executing program might reference the value of B following line 2 but before line 9, it would be invalid to avoid to the store of B's value to storage in line 2.

Figure 2A:
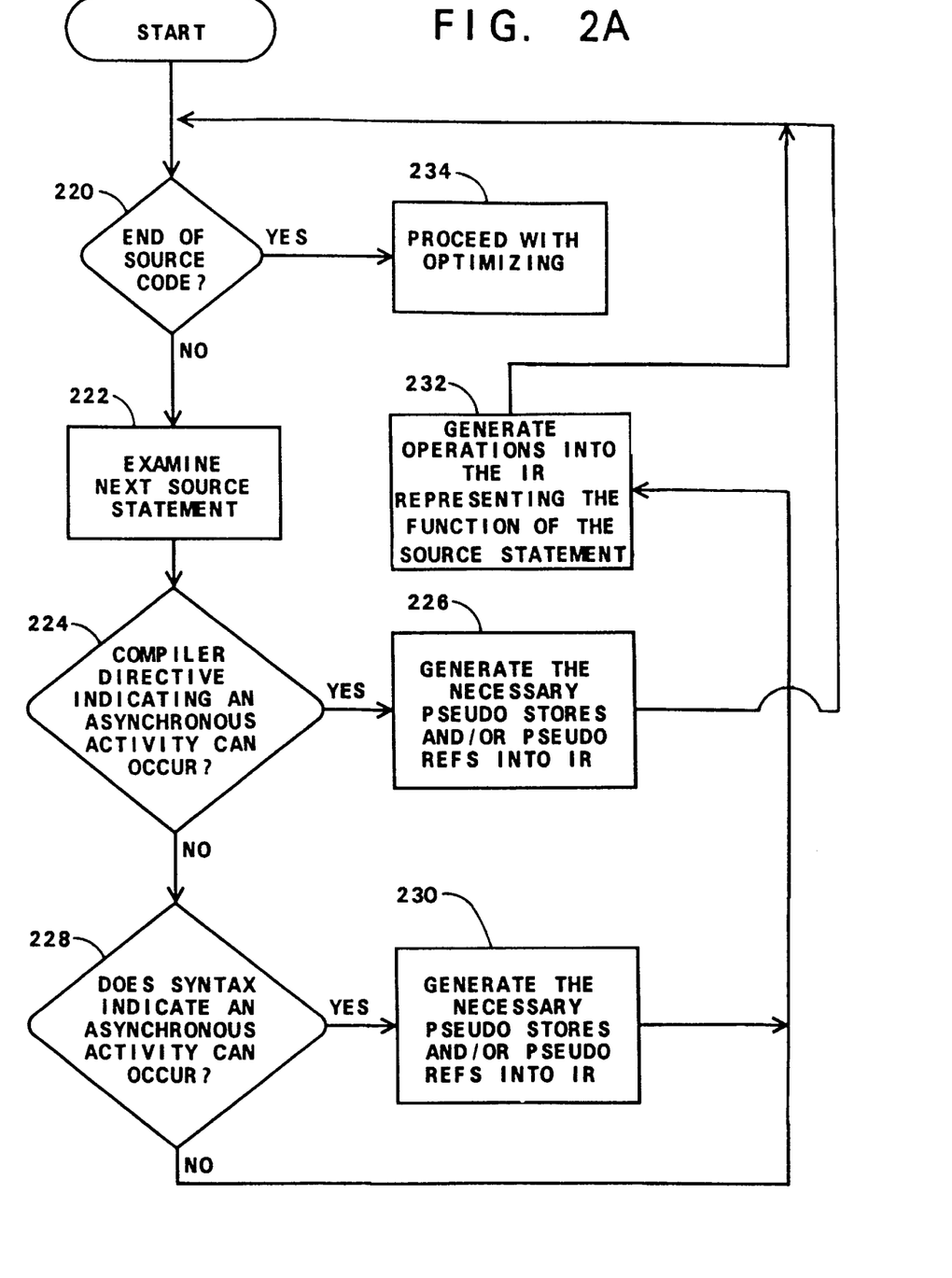
FIG. 2A is a logic flow diagram illustrating sequential operations of the present invention for inserting pseudo operations into a first intermediate representation.

Referring also to FIG. 2A, there is shown a logic flow diagram illustrating sequential operations for inserting pseudo operations into a first intermediate representation. In accordance with the present invention, a visibility boundary is identified by a pseudo operation in the first intermediate representation. The sequential steps begin with checking for the end of the code for the source program 20 as indicated by a decision block 220. If not, a next source code statement is examined as indicated at a block 222. Block 224 determines if the statement is a compiler directive which indicates that an asynchronous activity can occur. If so, then the necessary pseudo stores and/or pseudo references are generated into the first intermediate representation as indicated at a block 226. Otherwise, processing continues with step 228.

Block 228 determines if it can be inferred from the syntax that an asynchronous activity can occur. If so, then the necessary pseudo stores and/or pseudo references are generated into the first intermediate. representation as indicated at a block 230. Otherwise, processing continues with step 232. Step 232 generates the operations into the intermediate representation that represent the function of the source statement. The sequential operations return to step 220 and are repeated until the end of the source code is identified at block 220. Then processing proceeds with the code optimization process as indicated at a block 234.

Figure 5:
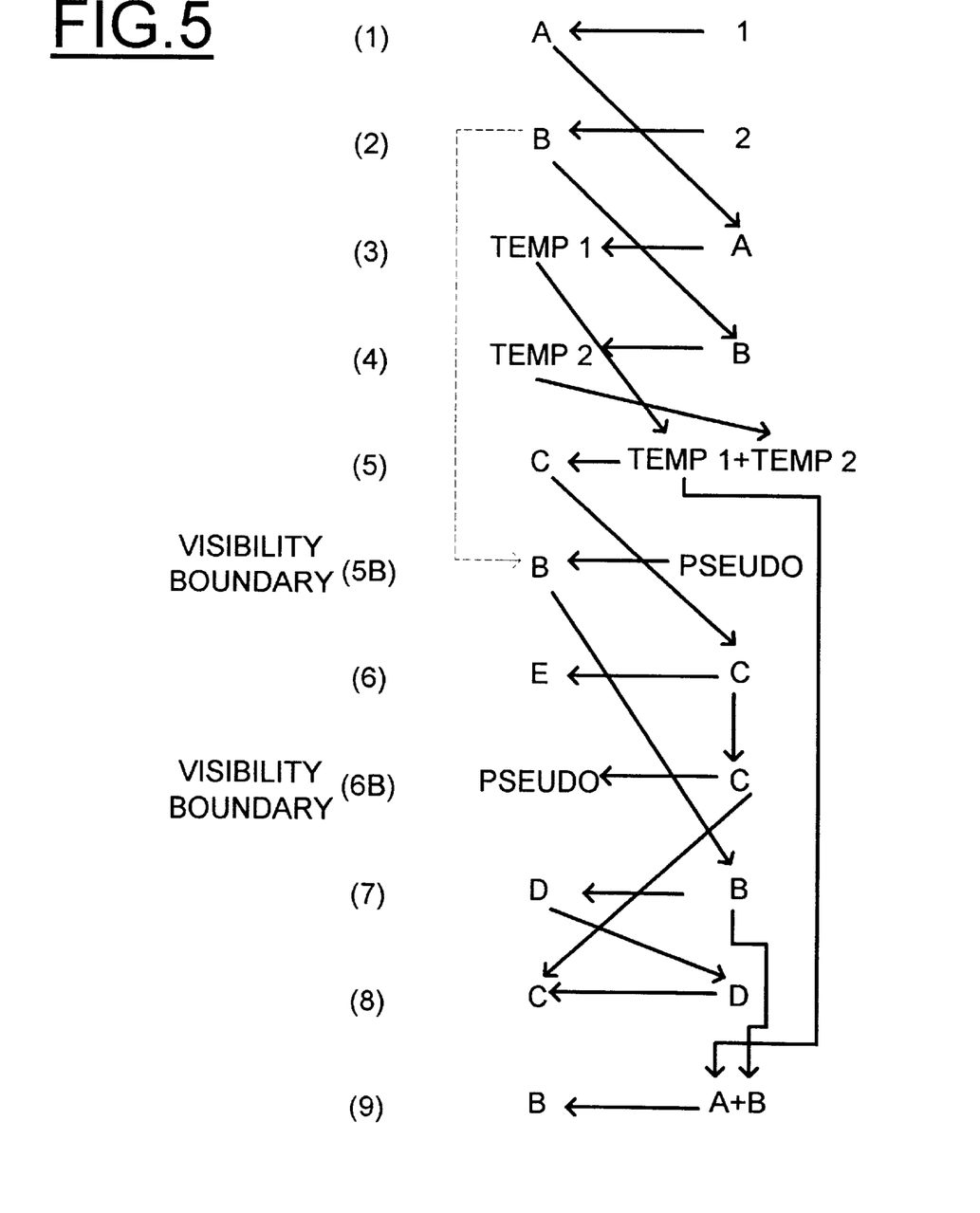
FIG. 5 is a chart illustrating pseudo operations inserted in the intermediate representation in accordance with the present invention.

In FIG. 5, the use of pseudo operations in the first intermediate representation in accordance with the present invention is illustrated. As shown, for example, there is a possibility that some asynchronous activity might modify the variable B between lines 5 and 6. The possibility of this asynchronous action is made known to the front end 202 of the compiler 12 via some notation in the source program for example, such as a pragma in the C language. Also the possibility of asynchronous activity can be inferred by the front end 202 based on language rules which is the case for some special cases in the PL/I language. Thus, the front end block 202 needs to convey this information to the remaining steps of the compiler 12 in a fashion that assures correct execution of the resulting program but at the same time permits as many safe or correctness preserving optimizations as possible. In accordance with the invention, the front end 202 inserts a pseudo store at line 5b in the intermediate representation as represented by the pseudo to the right of the bold arrow for a particular selected variable. This addition to the intermediate representation is referred to as a pseudo operation since, like a pseudo operation in assembler language, it does not directly imply that code should be generated but rather provides information used to direct the code generation process.

In this example, this pseudo store instruction tells the optimizer 206 and whatever optimization steps that might occur in the code generator 210, to behave as if a modification of B occurred at line 5*b*. The pseudo store instruction does not tell the optimizer 206 and code generator 210 to actually generate code to modify variable B, nor does it tell the optimizer 206 or code generator 210 what value might be stored in B. In fact, it only indicates that a store to B might occur at this location, so the previous store to B that appears in line 2 must still occur to handle the case where the possible store at 5*b* does not occur. This is represented by the dotted line between line 2 and line 5*b*. To the optimizer 206, the new operation inserted at 5*b* appears much like any other operation in the intermediate representation. In practice, it would generally be treated as an aliased modification of B, since this provides the necessary preservation of the store to B in line 2. Thus, the pseudo operation of line 5*b* is carried through the optimization step and preserved in its output, in the process assuring that the value of B is properly stored during or following line 2 and properly reloaded during or prior to line 7. Similarly, the pseudo operation from line 5*b* is carried part way through the actual code generation step exercising proper control over any additional optimization steps present there. When the code generation step actually generates the realization of the program, no code is generated directly due to the presence of the pseudo operation in the intermediate representation.

Similarly, if an asynchronous reference to the value of C might occur between lines 6 and 7, the front end block 202 inserts a pseudo reference instruction there, as shown at line 6*b* of FIG. 5. This pseudo reference instruction tells the optimizer 206 and subsequent steps to behave as if a reference to C occurs at line 6*b*. In addition, the optimizer is to behave as if this reference is necessarily to the storage form of C as opposed to a copy of C held in a register. Again, this result is most readily attained by treating line 6*b* as an aliased reference to C, since aliased references must generally refer to the storage form of the aliased variable. This pseudo operation has the effect of forcing the current value of C to be stored into its home storage location somewhere between line 5 where the value is assigned and line 6*b* where the pseudo reference appears.

The addition of pseudo references and pseudo stores in accordance with the invention conveys to the optimization and code generation steps detailed information about the otherwise unseen references to and modifications of the selected variables in the to-be-compiled program. This information, when presented as pseudo stores and pseudo references, is in a form that can be conveniently processed by the optimization and code generation steps, in large part using facilities that exist for other purposes. Processing the information in this way with little additional logic in the optimizer or code generator inherently produces a safe, meaning-preserved program.

Figure 3:
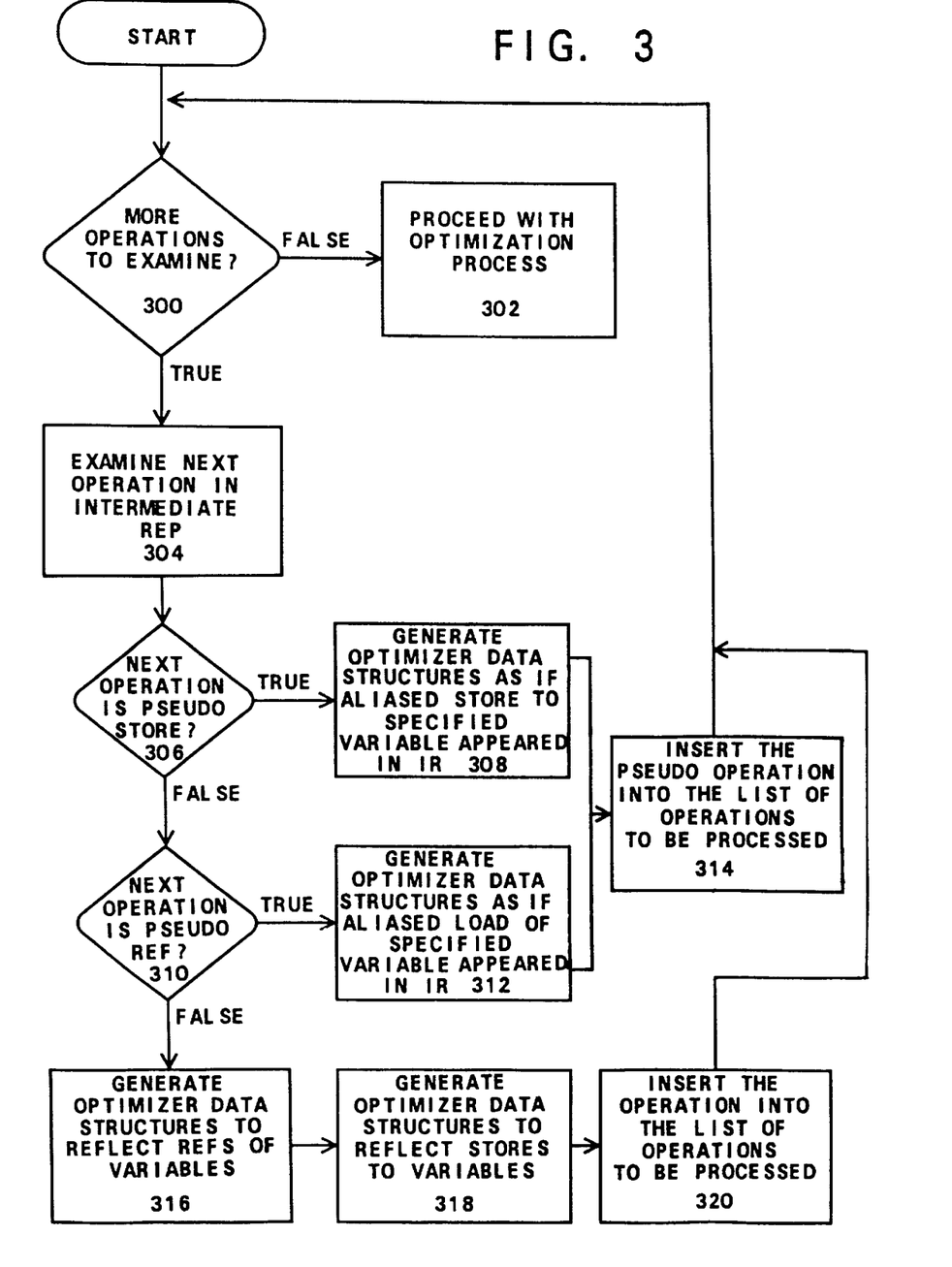
FIG. 3 is a logic flow diagram illustrating sequential operations of the present invention for producing an internal data structure used to optimize the source program being compiled.

FIG. 3 illustrates a typical implementation of this invention. The sequential steps begin with accepting an intermediate representation of a program from the front end 202 and manipulating it into the internal form needed by the optimization step. A nearly identical sequence is involved in accepting an intermediate representation of a program from a front end or optimization step and manipulating it into an internal form needed by the code generation step 210.

Initially, at the start of the sequential operations at a block labelled START, the front end step 202 has produced an intermediate representation of the program being compiled including the pseudo operations as defined by the invention. In addition, a master control program or the like has initiated the execution of the optimization step, and the necessary initialization of currently empty data structures for the optimization step has occurred.

Sequential steps represented by blocks 300–320, with the exception of step 302, comprise a loop which processes the first intermediate representation produced by the front end and produces an internal data structure which can then be manipulated in order to optimize the source program being compiled. This loop executes repeatedly until decision block 300 finds that there are no more operations to examine in the incoming intermediate representation, with each execution of the steps 300, 304–320 of the loop processing one operation or pseudo operation from the incoming intermediate representation.

With the exception of steps 306–314, this process is typical of existing art. Block 300 tests to determine if there is more input to process. If not, control passes to block 302 which causes the actual optimization process to begin. Block 304 examines the next operation in the incoming intermediate representation, converting it to a form more readily used by succeeding steps.

Block 316 determines which variables are referenced by the operation and produces the data structures necessary to incorporate these references into live range calculations. Block 318 determines which variables are modified by the operation and produces the data structures necessary to incorporate these modifications into live range calculations. The term live range is used here in a generic sense. The structures created at blocks 316 and 318 may be used for computing any of a number of well-known attributes of the variables involved, such as live range, def-use chains, use-def chains, availability and anticipation, etc. In both steps, the structures created are likely to reflect both directly affected variables and those affected as a result of aliasing as described above.

Block 320 adds the function of the operation itself, for example, ADD, to the internal form being constructed. In the typical implementation, the datum constructed as a result of this step 320 will reference the data resulting from steps 316 and 318, so that the operation and its operands are appropriately interconnected.

Steps 306–314 illustrate sequential steps in accordance with the method of the invention. Step 306 determines if the operation previously examined in step 304 is a pseudo store. If so, processing continues with step 308; otherwise, processing continues with the similar test of step 310. Step 308 further examines the incoming operation and determines what variable or variables are the subject of the pseudo store. Each variable found in this step is added to the internal data structures using the same technique that would have been used to handle a variable modified by an aliased store in step 318.

Step 310 determines if the operation previously examined in step 304 is a pseudo reference. If so, processing continues with step 312; otherwise, processing continues with step 316. Step 312 further examines the incoming operation and determines what variable or variables are the subject of the pseudo reference. Each variable found in this step is added to the internal data structures using the same technique that would have been used to handle a variable referenced via an alias in step 316.

Next an optional step 314 inserts a pseudo operation previously examined by step 308 or 312 into the list of operations to be processed of the internal form being created. Step 314 may be unnecessary if only simple optimizations will be performed and if no attempt will be made to perform further optimizations by reexecuting the entire optimization step or by placing some optimization steps in the code generation step. While the operations of steps 308 and 312 may have sufficed to assure safe optimization in the current situation, step 314 serves to preserve the knowledge of the pseudo operation so that further or repeated optimization steps will be assured of similar safety. In some realizations, step 314 may be necessary even in the simple case, since some techniques for controlling optimization require the presence of an apparent operation in the internal form being processed in order to trigger the appropriate processing of the variable reference/modification structures built in steps 308, 312, 316 and 318.

While the invention has been described with reference to details of the illustrated embodiments, these details are not intended to limit the scope of the invention as defined in the appended claims.

What is claimed and desired to be secured by Letters Patent of the United States is:

1. A digital computer implemented method for converting a source program to an object code comprising the steps of:
   receiving the source program;
   generating a first intermediate representation of the source program;
   inserting a pseudo operation in said first intermediate representation representing a predetermined event; said predetermined event indicating an asynchronous activity can occur at a selected point in said first intermediate representation of the source program;
   processing sequential operations of said first intermediate representation including said inserted pseudo operation and defining an internal data structure of the source program including a corresponding visibility boundary for said inserted pseudo operation in said first intermediate representation; said visibility boundary being used for limiting store elimination and load elimination optimizations at said visibility boundary;
   processing said defined internal data structure and generating an optimized intermediate representation; and
   processing said optimized intermediate representation and generating the object code;
   wherein said step of inserting said pseudo operation in said first intermediate representation representing said predetermined event includes the steps of:
      identifying either compiler directive or syntax in the source program indicating said asynchronous activity can occur;
      generating a pseudo store instruction for selected variables at said selected point in said first intermediate representation of the source program; and
      defining a pseudo reference instruction for selected variables at said selected point in said first intermediate representation of the source program.

2. A digital computer implemented method as recited in claim 1 wherein said processing step defining said internal data structure of the source program including said visibility boundary includes the step of:
   generating an optimizer data structure corresponding to an aliased store to said selected variables responsive to said generated pseudo store operation for said selected variables.

3. A digital computer implemented method as recited in claim 2 further includes the step of:
   generating an optimizer data structure corresponding to an aliased load of said selected variables responsive to said generated pseudo reference operation for said selected variables.

4. A digital computer implemented method as recited in claim 2 wherein said steps of processing sequential operations of said first intermediate representation including said inserted pseudo operation and defining said internal data structure of the source program includes the steps of:
   generating a list of operations to be processed and further includes the step of:
      inserting said pseudo operation into said list of operations to be processed after generating said optimizer data structures corresponding to said aliased store.

5. A digital computer implemented method as recited in claim 4 further includes the step of:
   inserting said pseudo operation into said list of operations to be processed after generating said optimizer data structures corresponding to said aliased load.

6. A compiler for use with a digital computer for converting a source program to an object code comprising:
   input means for receiving the source program;
   means responsive to said input means for generating a first intermediate representation of the source program;
   means for inserting a pseudo operation representing a predetermined event in said first intermediate representation; said predetermined event indicating an asynchronous activity can occur at a selected point in said first intermediate representation of the source program;
   means for processing sequential operations of said first intermediate representation including said inserted pseudo operation and defining an internal data structure of the source program; said processing means including;
   means responsive to processing said inserted pseudo operation for defining a visibility boundary; said defined visibility boundary being used for limiting store elimination and load elimination optimizations at said visibility boundary;
   means for processing said defined internal data structure and generating an optimized intermediate representation;
   means for processing said optimized intermediate representation and generating the object code; and
   wherein said means for inserting said pseudo operation include:
      means for identifying either compiler directive or syntax indicating said asynchronous activity can occur; and
      means for generating a pseudo store instruction for a selected variable at said selected point in said first intermediate representation of the source program.

7. A compiler as recited in claim 6 wherein said means for inserting said pseudo operation include:
   means for identifying either compiler directive or syntax indicating said asynchronous activity can occur; and
   means for defining a pseudo reference instruction for a selected variable at said selected point in said first intermediate representation of the source program.

8. A compiler as recited in claim 7 wherein said means for defining said visibility boundary include means for generating an optimizer data structure corresponding to an aliased load of said selected variable responsive to said generated pseudo reference operation for said selected variable.

9. A compiler as recited in claim 6 wherein said means for defining said visibility boundary include means for generating an optimizer data structure corresponding to an aliased store to said selected variable responsive to said generated pseudo store operation for said selected variable.

* * * * *